July 26, 1966 M. C. ANDREWS 3,263,216

PATTERN RECOGNITION ERROR CORRECTION SYSTEM EMPLOYING VARIABLE PARAMETER INPUT DEVICE

Filed March 20, 1964 4 Sheets-Sheet 1

INVENTOR
MAXWELL C. ANDREWS
BY Edward G. Fiorito
ATTORNEY

July 26, 1966 M. C. ANDREWS 3,263,216
PATTERN RECOGNITION ERROR CORRECTION SYSTEM EMPLOYING VARIABLE PARAMETER INPUT DEVICE
Filed March 20, 1964 4 Sheets-Sheet 2

HIGH SENSITIVITY

NORMAL SENSITIVITY

LOW SENSITIVITY

PATTERN RECOGNITION ERROR CORRECTION SYSTEM EMPLOYING VARIABLE PARAMETER INPUT DEVICE

Filed March 20, 1964

4 Sheets-Sheet 3

United States Patent Office 3,263,216

Patented July 26, 1966

3,263,216

PATTERN RECOGNITION ERROR CORRECTION SYSTEM EMPLOYING VARIABLE PARAMETER INPUT DEVICES

Maxwell C. Andrews, Bethesda, Md., assignor to International Business Machines Corporation, New York, N.Y., a corporation of New York Filed Mar. 20, 1964, Ser. No. 353,329
11 Claims. (Cl. 340—146.3)

This invention relates to systems for identifying patterns, and more particularly to such systems which employ scanners to develop a signal representative of the pattern.

Normally the signal developed by the scanner is fed to a pattern recognition system which processes the signal to determine the identity of the pattern. If the pattern is not identified a reject signal is provided which may cause an operator to assist the recognition system in identifying the rejected pattern, or the rejected pattern may be marked for later identification so that the recognition system can move on to the next pattern without delay.

Since each rejected pattern must be handled in a special manner, the value of the pattern recognition system depends to a great extent upon the number of patterns which are recognized as compared with the number of patterns rejected, commonly called the reject rate.

The reject rate can be lowered by performing more elaborate processing schemes upon the signal provided by the scanner. This however increases the expense of the pattern recognition system and may also increase the time necessary to perform the more elaborate processing.

Members of the alphabet of certain languages cause pattern recognition systems to operate with a high reject rate. For example the Russian alphabet includes members having horizontal and slant strokes that are often very thin as compared to other lines of other members of the alphabet. This variation in line thickness requires the scanner to have a wide range of sensitivity in order to accommodate both the thick and thin lines and distinguish them from the uniform background on which the pattern appears.

Another related problem occurs when a large number of carbon copies are prepared by a typewriter. Frequently the last carbon copy is very faint and individual letters are smudged together, as compared to the sharp clear letters on the original document. Both original and carbon copies may be fed into the same scanner for processing requiring the scanner to have a wide range of sensitivity.

In order to achieve a wide range of sensitivity to accommodate all possible line widths and all variations in pattern impression, expensive electronic-optical equipment having high accuracy and high resolution must be employed.

It is an object of the present invention to provide an improved pattern recognition system.

Another object of the present invention is to provide a pattern recognition system having a lower reject rate.

A further object of the present invention is to lower the reject rate of a pattern recognition system without increasing the complexity of the processing procedure.

Still another object of the present invention is to lower the reject rate of a pattern recognition system without increasing the number of samples of the pattern taken by the scanner.

A further object of the present invention is to provide an improved pattern recognition system capable of recognizing patterns having lines of varying width and sharpness.

Another object of the present invention is to lower the reject rate of a pattern recognition system employed to recognize patterns having lines of varying width without increasing the tolerance and accuracy requirements of the electronic-optical scanner equipment.

These and other objects of the present invention are accomplished by adding separate control circuitry to a conventional pattern recognition system which operates only after a pattern is rejected. The control circuit causes the scanner to rescan rejected patterns and develop another signal representative of the rejected pattern. Prior to rescanning the rejected pattern, a parameter of the scanner is changed, such as sensitivity to the light reflected from the rejected pattern, the size of the spot illuminating the rejected pattern, or the number of samples taken from the rejected pattern. It has been found that the new signal generated by the altered scanner frequently permits a rejected pattern to be recovered and identified by the pattern recognition system.

One parameter of the scanner which has been found to be quite successful in recovering rejected patterns is the sensitivity of the scanner to light reflected from the rejected pattern. This parameter may be adjusted by providing a variable sensitivity amplifier for blocking signals below a certain threshold. Whenever the pattern recognition system cannot identify a pattern the control circuitry raises or lowers the threshold and the scanner develops another signal representative of the rejected pattern. By altering the threshold a successive number of times the proper range of sensitivity can be found to accommodate a particular pattern.

The same scanner can be used again upon another pattern having a different line thickness or impression by adjusting the sensitivity following a reject. In this manner the scanner need not be designed to initially accommodate all possible ranges of pattern variation that could be expected.

A further advantage of the present invention is that the pattern recognition system which performs the processing of the signal developed by the scanner is not changed by the improvement of the present invention. The subsequent signals developed after the pattern is rejected are processed in the usual manner through the pattern recognition system requiring no alteration of this relatively complex equipment.

The foregoing and other objects, features and advantages of the invention will be apparent from the following more particular description of a preferred embodiment of the invention, as illustrated in the accompanying drawings.

In the drawings:

FIG. 1 is a block diagram illustrating the present invention;

FIGS. 2*a* through 2*c* are diagrams illustrating the various degrees of sensitivity to the pattern image exhibited by the scanner in FIG. 1;

Figure 1:
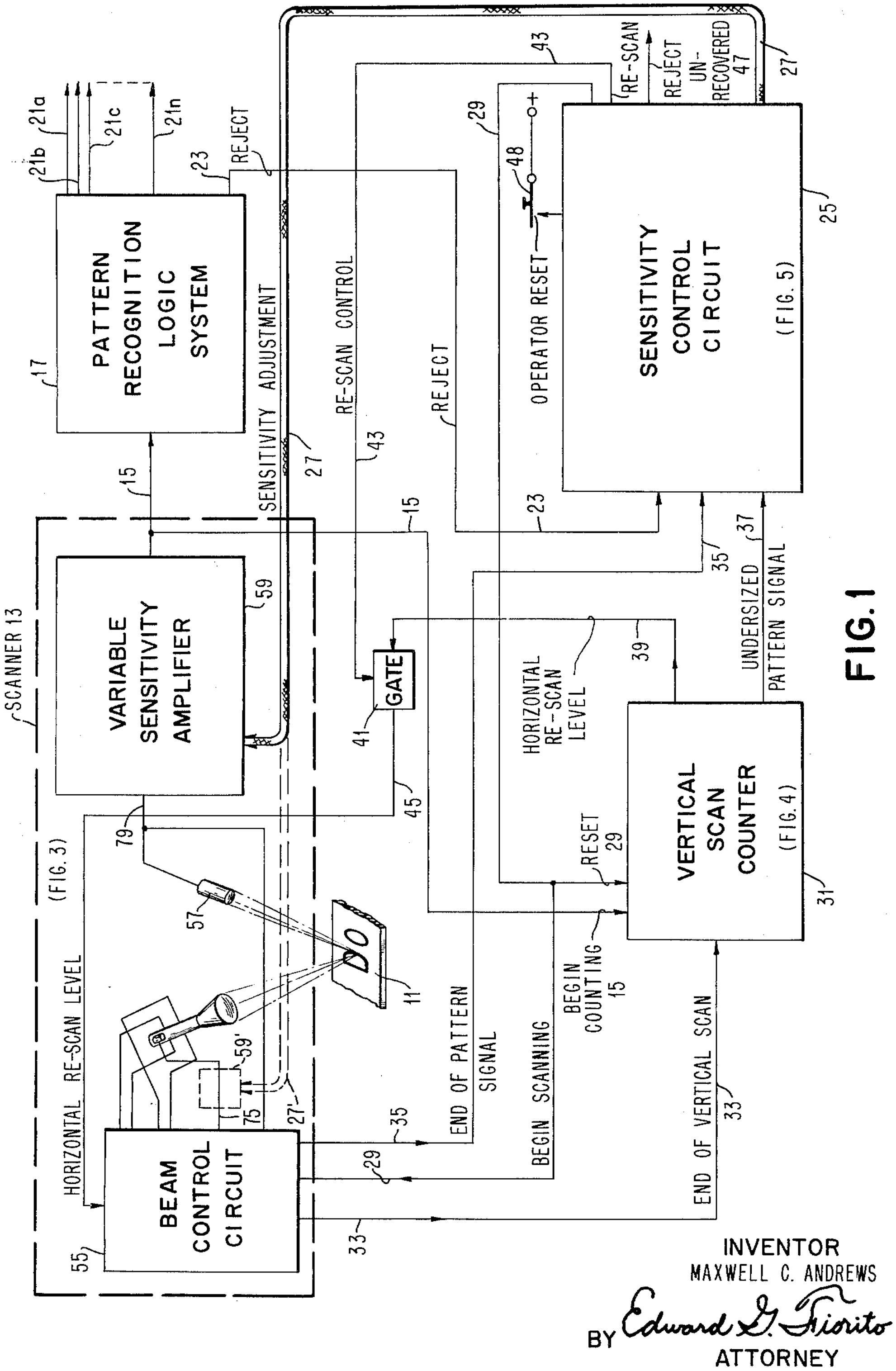

The block diagram of the present invention shown in FIG. 1 includes two letters, "D" and "O," located on a document 11. The patterns on document 11 are scanned by a scanner 13 enclosed in the broken lines, which develops an electrical signal on a line 15 representing the patterns on document 11. A pattern recognition logic system 17 processes the signal on line 15 and attempts to identify the patterns on document 11 one at a time. If the recognition is successful, a signal is provided on one of a group of lines 21*a* through 21*n* indicating the proper identity of the pattern. If the pattern recognition logic system 17 is unable to identify the pattern a reject signal is provided on a reject line 23.

The reject signal on line 23 initates a sequence of operations attempting to recover the rejected pattern by causing the pattern recognition logic system 17 to provide an identifying signal on one of the lines 21. A sensitivity control logic circuit 25 performs the function of adjusting one of the parameters of scanner 13 in response to signals supplied via a cable 27.

Another function performed by the sensitivity control logic circuit 25 is to cause scanner 13 to rescan the rejected pattern on document 11. A signal is provided on a line 29 which causes the scanner 13 to begin its rescan operation.

In order to determine the width of each pattern on document 11 a vertical scan counter 31 is provided in FIG. 1. The scanner 13 scans each pattern by making a number of vertical passes over the pattern in a manner to be described in detail in connection with FIGS. 2*a*–2*c*. At the end of each vertical scan a signal is supplied on a line 33 to counter 31. When the end of a pattern is reached a signal is supplied on a line 35 to sensitivity control circuit 25. At this time the vertical scan counter 31 provides a signal on a line 37 indicating whether the pattern is undersized; a pre-set number of vertical scans is used as the criterion in a manner to be described in detail with respect to FIG. 4. The sensitivity control logic circuit 25 adjusts a parameter of scanner 13 in a direction determined by the presence or absence of a signal on line 37. More details of the manner in which this adjustment is accomplished are provided in connection with FIG. 5.

The vertical scan counter 31 also performs the function of shifting the scanner a certain amount so that each rejected pattern is rescanned. A signal level is provided on a line 39 having a level corresponding to the width of the rejected pattern on document 11. Line 39 is connected to a gate 41 which is opened in response to a signal on a line 43. The signal on line 43 is provided each time a pattern is rejected. At the same time scanner 13 begins scanning in response to a signal on line 29. When gate 41 is opened the signal level on line 39 is fed to scanner 13 via a line 45 where it shifts the fields of view so that the rejected pattern is rescanned in a manner to be described in detail in connection with FIG. 3.

If after a number of adjustments of scanner 13 the rejected pattern on document 11 cannot be recognized, sensitivity control circuit 25 provides a signal on a line 47 indicating that the reject cannot be recovered. An operator may identify the rejected pattern and press an operator reset button 48 which causes scanner 13 to begin scanning the next character in response to a signal on line 29.

Figure 2A:
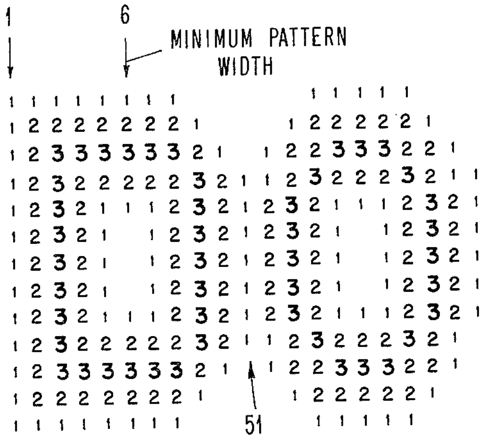
Figure 2B:
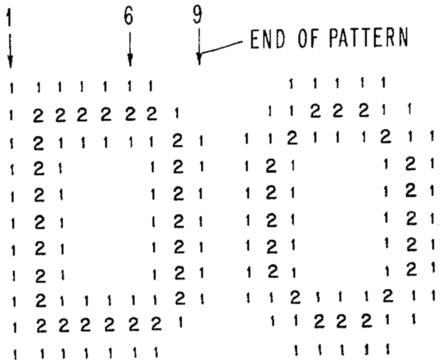
Figure 2C:
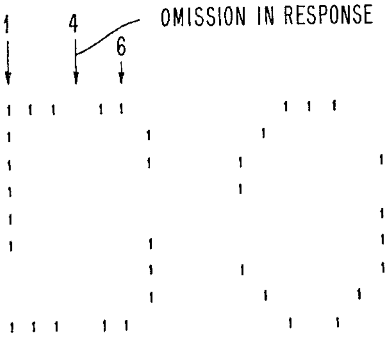

*Scanner sensitivity diagrams, FIGS. 2a–2c*

FIGS. 2*a*–2*c* represent the electrical signals developed by the scanner 13 with various adjustments to the scanner sensitivity. The same pattern is scanned on document 11 in FIG. 1 resulting in one of the signals represented by the diagrams in FIGS. 2*a*–*c*. The large numbers in the diagrams indicate that a large signal is developed at that point while the small numbers indicate a weak signal response.

FIG. 2*b* illustrates the normal sensitivity of the scanner 13. For this sensitivity the scanner responds only to the dark traces of the patterns on document 11. Therefore there is a space between the letters "D" and "O" where the scanner receives no response indicating that there are two separate patterns on the document 11.

However in FIG. 2*a* the diagram illustrates the response of the scanner to the same patterns when the sensitivity is high. Here, the scanner responds to any fringes or smudges around the traces of the patterns. For this condition the diagrams overlap in a region 51.

Due to the overlap of the diagrams in regions 51, the scanner responds continuously from the left end of the "D" to the right end of the "O." Therefore no separation between patterns is detected. This causes a reject to be provided by the pattern recognition logic system 17 since no letter or number of the alphabet resembles the combined pattern of the "D" and "O" as shown in FIG. 2*a*.

Other rejects are caused when the sensitivity of the scanner 13 is set too low. FIG. 2*c* illustrates the response of the scanner 13 to the patterns on document 11 when the sensitivity of the scanner is set too low. As shown in FIG. 2*c*, the diagrams are broken in many places. For example during the fourth scan the scanner does not respond to the trace of the letter "D" due to the low sensitivity of the scanner. Although a trace of the letter "D" exists at points along the seventh scan it is not sufficiently dark to excite the scanner causing portions of the diagram in FIG. 2*c* to be omitted. These omissions frequently cause the pattern to be rejected.

There are various reasons why the sensitivity of the scanner becomes too high or too low. For example the ribbon on a typewriter may wear so that the pattern becomes lighter resulting in a sensitivity which is too low, as shown in FIG. 2*c*. Also a high number of carbon copies may be prepared where the last copy becomes smudged or fringed causing a response as shown in FIG. 2*a*.

A scanning tube 53 in FIG. 1 illuminates the patterns on document 11 with a spot of light directed by a beam control circuit 55. The spot of light makes a number of successive vertical passes over the patterns. For example as shown in FIG. 2*b* the first vertical scan passes over the left edge of letter "D." Nine other vertical scans are made by the beam before reaching the right end of pattern "D." A phototube 57 responds to the portion of the patterns illuminated by the spot of light, darker portions producing a low level signal and light background portions producing a higher level signal. The output of the phototube 57 is fed to a variable sensitivity amplifier 59 in FIG. 1. Amplifier 59 includes a detecting device (not shown in FIG. 1) which causes an output on line 15 when a dark portion of the pattern is illuminated. The degree of darkness necessary to cause an output can be adjusted by changing the threshold of response of amplifier 59. Therefore when the threshold of amplifier 59 is set to provide a high sensitivity response, a signal as shown in FIG. 2*a* is developed. However, if the patterns remain unchanged and the threshold of amplifier 59 is raised to provide a normal sensitivity response, the signal developed on line 15 represents the diagram as shown in FIG. 2*b*.

Another reason for the fringing, or smudging of the patterns is the size of the spot illuminated by tube 53. A wide spot illuminates a larger area of the patterns. If the sensitivity of scanner 13 is too high then the area surrounding the center of the spot becomes sufficiently illuminated to cause the scanner to respond to portions of the pattern surrounding the center of the spot producing a response as shown in FIG. 2*a*. Therefore, if the size of the spot is altered by defocusing or through other changes in the scanning tube operation, proper operation of the scanner 13 can be maintained by adjusting the sensitivity of the amplifier 59.

*Detailed description*

Figures 3, 4:
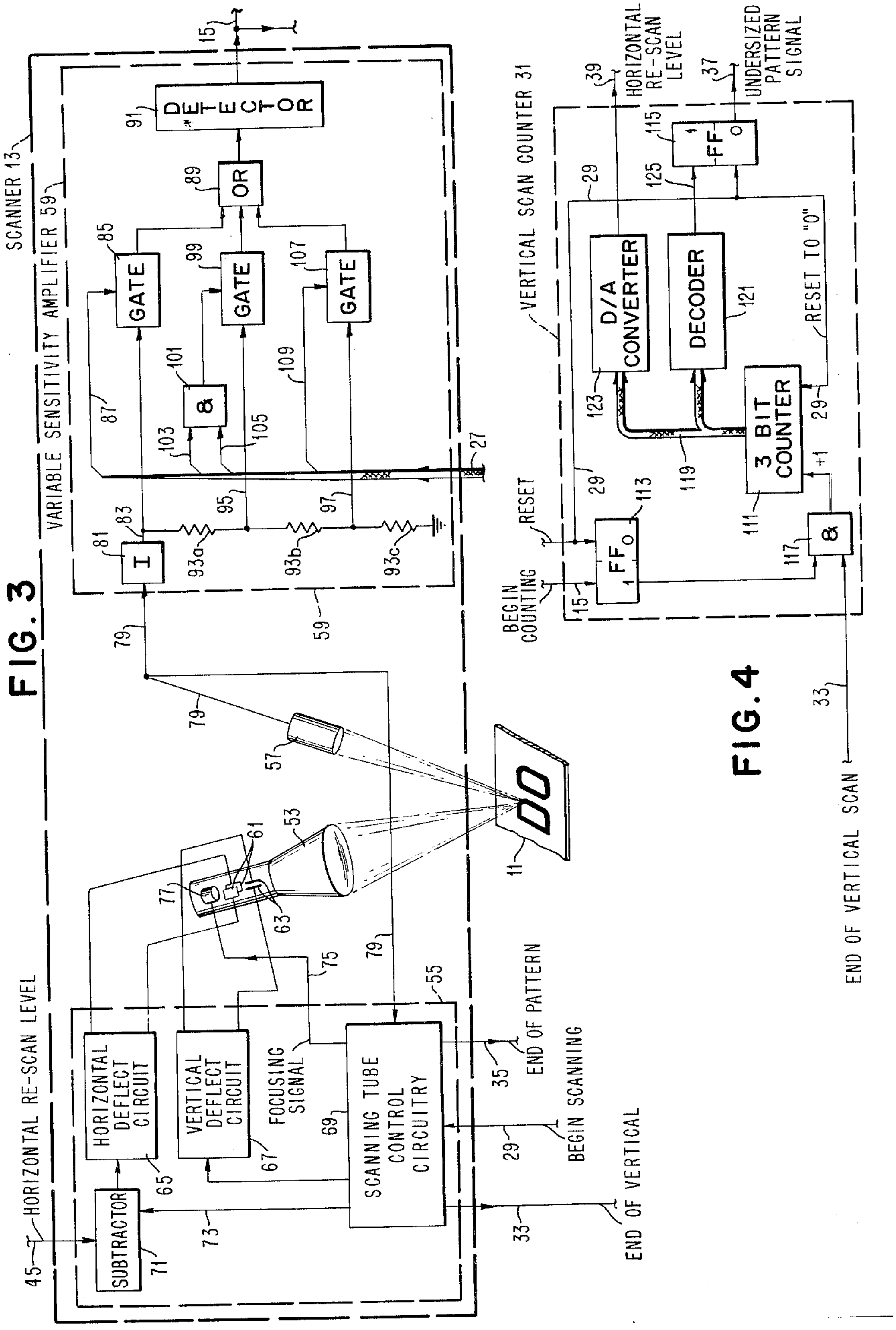
FIG. 3 is an electrical schematic illustrating the details of the scanner in FIG. 1.
FIG. 4 is an electrical schematic illustrating the details of the vertical scan counter in FIG. 1.
Figure 5:
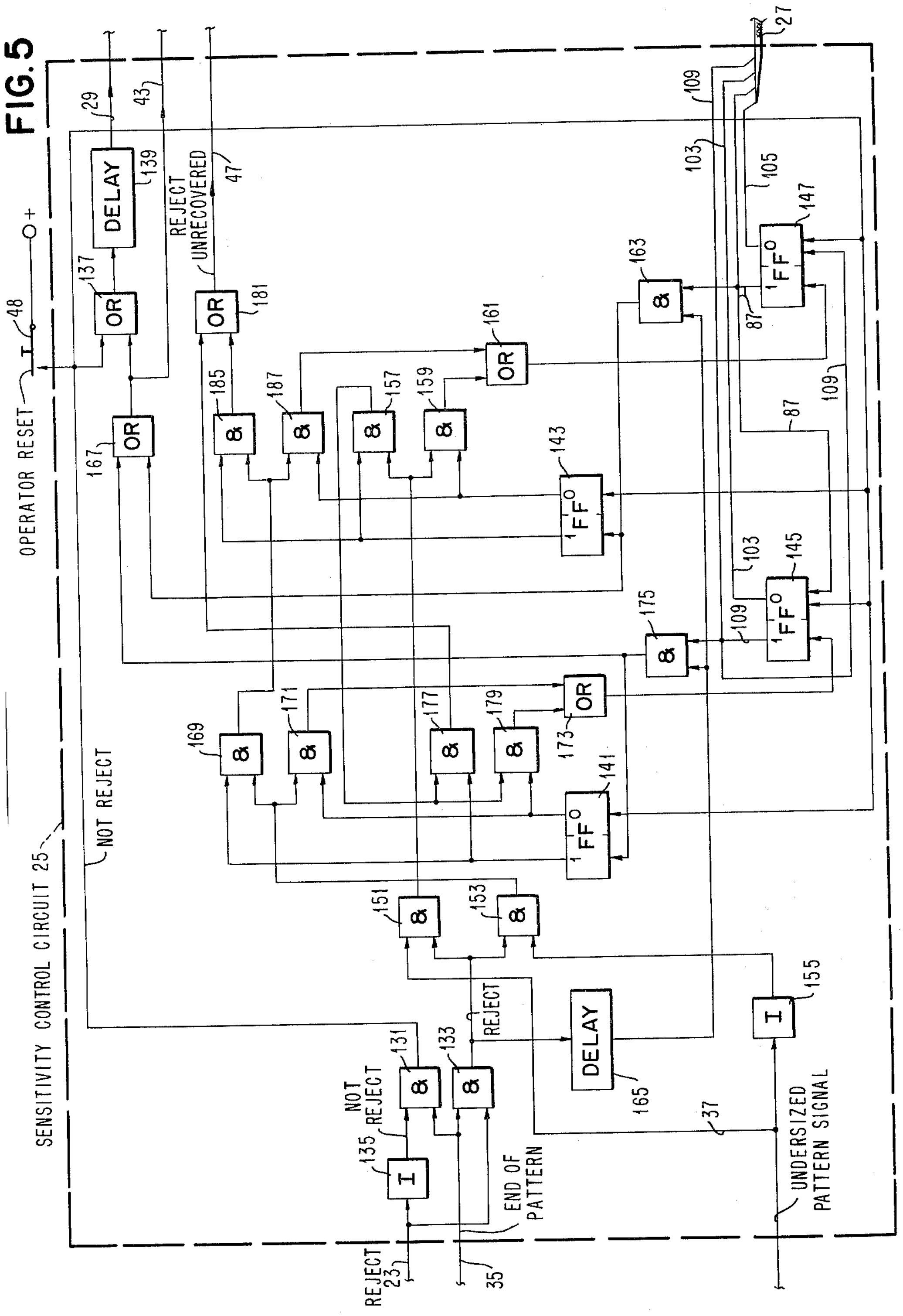
FIG. 5 is an electrical schematic illustrating the sensitivity control circuit of FIG. 1.

Additional details of the scanner 13 are shown in FIG. 3, while details of the vertical scan counter 31 and sensitivity control circuit 25 are shown in FIGS. 4 and 5 respectively. No additional details of pattern recognition logic system 17 are shown since such systems are well known in the art. For example, commonly assigned co-pending application Serial No. 330,394 by Jose Reines entitled "Specimen Identifying Computer" illustrates a pattern recognition system which accepts a signal developed by a vertical scanner and provides either an indication of the identity of the pattern or a reject thereby performing the function of pattern recognition logic system 17 in FIG. 1. Various other pattern recognition systems could be employed with only slight modification to provide synchronization with the scanner developing the signal. Such synchronizing circuitry is well within the abilities of one skilled in the art and is not included in the description of the present invention.

FIG. 3 illustrates the details of scanner 13. The same numbers are used to designate like elements in FIGS. 1 and 3. A scanning tube 53 includes horizontal and vertical deflection plates 61 and 63, respectively. A horizontal deflection circuit 65 and a vertical deflection circuit 67 provide signals which control the position of the spot on the document 11. Vertical deflection circuit 67 receives a sawtooth waveform from scanning tube control circuitry 69 which causes the beam to move vertically up and down over the patterns on document 11. Horizontal deflection circuit 65 receives a signal from a subtractor 71, which receives one signal on a line 73 from scanning tube control circuitry 69. The signal on line 73 is a ramp function tending to move the beam across the document 11 from left to right. The subtractor 71 receives another signal on line 45 having a signal level corresponding to the number of vertical scans counted by counter 31 as discussed above. The level on line 45 is subtracted from the level on line 73 causing the beam to return to the left side of the pattern on document 11 which was rejected. In this manner the beam rescans the rejected pattern causing the phototube 57 to develop another signal representative of the rejected pattern.

The scanning tube control circuitry 69 also provides a signal on a line 75 connected to a focusing anode 77 of scanning tube 53 for controlling the size of the beam.

In order to determine when the end of a character is reached the output of phototube 57 is applied via a line 79 to scanning tube control circuitry 69. If a complete vertical sweep is completed without striking a trace of a pattern, a signal is provided on line 35 indicating the end of a pattern. This is accomplished within the scanning tube control circuitry 69 by monitoring the arrival of signals on line 79 during the interval of each vertical sweep. At the end of each vertical sweep a signal is provided on line 33 to counter 31, and scanning is resumed after the end of a pattern by the application of a signal on line 29.

Many suitable scanning tube control circuits may be found in the prior art to perform the function of control circuitry 69. A particularly suitable one is shown in U.S. Patent 3,074,050 by G. L. Schultz entitled "Character Recognition Machine" and issued on January 15, 1963. Complete details of a scanning tube control circuitry capable of accomplishing all of the functions performed by scanning tube control circuitry 69 are shown in this patent and accordingly are not included herein.

The details of the variable sensitivity amplifier 59 are shown in FIG. 3. The signal developed by phototube 57 is inverted in an inverter 81 so that the dark traces of the pattern result in a high signal while the light background area of document 11 results in a low signal on a line 83. Line 83 is applied to a gate 85 which is opened by a signal on a line 87. When gate 85 is open the signal on line 83 is passed through to an OR gate 89 which in turn passes the signal to a detector circuit 91. Detector circuit 91 has a fixed threshold which permits signals above a certain threshold to pass through to line 15 and blocks all signals below this threshold. A tube (not shown) with a fixed grid bias may be employed to perform the function of detector 91.

The variable sensitivity amplifier 59 shown in detail in FIG. 3 includes a group of resistors 93a through 93c which perform the function of a variable attenuator. A line 95 taps off a signal level which is a portion of the level on line 83, while a line 97 taps off still less of a signal. The signal on line 95 is fed to a gate 99 which is open in response to the output of an AND gate 101. When both input legs of AND gate 101 are conditioned by signals on a pair of lines 103 and 105 the signal on line 95 passes through gate 99 and OR gate 89 to detector circuit 91. Since the signal on line 95 is attenuated with respect to that on line 83, only the darker portions of the patterns on document 11 provide signals of sufficient strength to pass through detector circuit 91 when gate 99 is open and gate 85 is closed.

The operation of variable sensitivity amplifier 59 shown in detail in FIG. 3 can be compared with the diagrams shown in FIGS. 2*a* and 2*b*. Since no attenuation of the signal on line 83 occurs when gate 85 is open the sensitivity of amplifier 59 is high producing a response as shown in FIG. 2*a*. However when gate 99 is open the signal is attenuated causing the output of detector circuit 91 to provide a signal representing patterns as shown in FIG. 2*b*.

The sensitivity of amplifier 59 can be lowered still further by passing the signal on line 97 through a gate 107 in response to a conditioning signal on a line 109. The signal passing through gate 107 and OR gate 89 is clipped by circuit 91 so that portions of the pattern traces produce signals below the clipping threshold of detector circuit 91. The signals above the threshold pass through detector 91 and correspond to the diagram in FIG. 2*c*.

Gates 85, 99 and 107 are opened one at a time in a manner described in detail below in connection with FIG. 5.

The details of vertical scan counter 31 are shown in FIG. 4. Counter 31 provides an indication of the width of the pattern scanned on document 11, and also shifts the horizontal deflection of the beam so that the rejected pattern is rescanned.

Counter 31 includes a binary counter 111 and two flip-flops 113 and 115 which are initially reset to the zero state by a signal on line 29. Binary counter 111 is a three bit binary counter having eight different settings.

When a signal appears on line 15 in response to the first illumination of a pattern on document 11, flip-flop 113 is placed in the one state causing an AND gate 117 to be opened. A signal on line 33 passes through AND gate 117 to binary counter 111 which counts the number of vertical scans encompassed by the pattern scanned on document 11. The output of the binary counter 111 is applied via a cable 119 to a decoder 121 and a digital-to-analog converter 123. The decoder 121 is connected to counter 111 so that a signal is provided on a line 125 when the counter 111 reaches a number of vertical scans equal to six. The number of vertical scans may be adjusted to suit the particular group of patterns to be observed.

The output of decoder 121 sets flip-flop 115 into the one state. If the binary counter 111 does not reach six, then flip-flop 115 remains in the zero state providing a signal on line 37 indicating that the pattern is undersized.

The digital-to-analog converter 123 converts the setting in binary counter 111 into a signal on line 39 having a level corresponding to the width of the pattern scanned on document 11. As described above the signal on line 39 is gated to the subtractor 71 in FIG. 3 via line 45 where it causes the beam to be shifted back to the left edge of the rejected character for rescanning.

FIG. 5 illustrates the details of the sensitivity control circuit 25. When the end of a pattern is reached, the signal on line 35 is applied to a pair of AND gates 131 and 133. The other leg of AND gate 133 is connected to line 23 while the remaining leg of AND gate 131 is connected via an inverter 135 to line 23. Therefore if the pattern is rejected a signal is provided by AND gate 133 while if the pattern is not rejected, AND gate 131 provides a signal. The output of AND gate 131 is fed through an OR gate 137 and a delay 139 to line 29 to begin the scanner 13 on a new pattern. The delay 139 is inserted to permit the output of gate 131 to reset a group of flip-flops 141, 143, 145 and 147 prior to the beginning of a new scan. In the absence of a reject, the sensitivity control circuit 25 permits the variable sensitivity amplifier 59 to remain in the normal condition. Flip-flops 145 and 147 remain in the zero state and lines 103 and 105 supply conditioning inputs via cable 27 to AND gate 101 in FIG. 3. As described above AND gate 99 passes the signal on line 95 which corresponds to the normal sensitivity level of amplifier 59.

When a reject occurs at the end of a pattern AND gate 133 passes a signal to one input leg of a pair of AND gates 151 and 153. The other leg of AND gate 151 is connected directly to line 37, while the other leg of AND gate 153 is connected to line 37 via an inverter 155. When the rejected pattern is undersized, AND gate 151 provides a signal to one leg of a pair of AND gates 157 and 159. With flip-flop 143 in the reset condition AND gate 159 passes a signal through an OR gate 161 to set flip-flop 147 in the one state. The output from flip-flop 147 provides a signal on line 87 which opens gate 85 in FIG. 3 to increase the sensitivity of amplifier 59.

The operation of the sensitivity control circuit 25 shown in detail in FIG. 5 can be coordinated with the diagram in FIG. 2*c* at this point. As an example the pattern "D" is shown to be broken at the location of the seventh scan. This is misinterpreted as the end of the pattern. The minimum pattern width is set to be 12 scans by the decoder 121 in FIG. 4. Therefore the vertical scan counter 31 indicates that the pattern is undersized providing a signal on line 37. The signal on line 37 results in the setting of flip-flop 147 which in turn increases the sensitivity of amplifier 59. Therefore during the rescan the response of amplifier 59 appears as that shown in FIG. 2*b*.

Returning to the detailed description of sensitivity control circuit 25 shown in FIG. 5, the one output of flip-flop 147 is connected to the zero input of flip-flop 145 in order to insure that flip-flop 145 is in the zero state when flip-flop 147 is in the one state. In a like manner the one output of flip-flop 145 is connected via line 109 to the zero input of flip-flop 147 to insure that flip-flop 147 is in the zero state when flip-flop 145 is in the one state.

The one output of flip-flop 147 is also connected to one input leg of an AND gate 163. The other input of AND gate 163 is received via a delay line 165 from the output of AND gate 133. The delay 165 is inserted so that flip-flop 147 has a chance to be set in the one state before AND gate 163 is conditioned. Flip-flop 143 is set in the one state in response to the output of gate 163.

The output of AND gate 163 is also applied to an OR gate 167. The output of OR gate 167 provides the rescan signal on line 43 and a delayed signal on line 29 which begins the scanner after the horizontal deflection circuit 65 in FIG. 3 has been shifted and the variable sensitivity amplifier 59 in FIG. 3 has been adjusted.

Up to this point the operation of the sensitivity control circuit 25 shown in detail in FIG. 5 has been described with regard to two different input conditions. The first one is when the pattern is not rejected, and the second is when a rejected pattern is undersized. Described below is a third input condition occurring when a rejected pattern is not undersized.

For this condition inverter 155 provides an input to AND gate 153; the other input to AND gate 153 is supplied by AND gate 133. The output of AND gate 153 is applied to a pair of AND gates 169 and 171.

The one output of flip-flop 141 is applied to AND gate 169, while the zero output is applied to AND gate 171. At this time flip-flop 141 is in the zero state so that AND gate 171 provides a signal through an OR gate 173 to set flip-flop 145 in the one state. The one output of flip-flop 145 switches flip-flop 147 to the zero state, conditions one leg of an AND gate 175 and provides a signal on line 109 to gate 107 in FIG. 3 causing the sensitivity of amplifier 59 to be reduced. Since the rejected pattern was not undersized, the reject is treated as though the response as shown in FIG. 2*a* exists and an attempt is made to recover the reject by decreasing the sensitivity.

Following this a signal appears at the output of delay line 165 conditioning AND gate 175, setting flip-flop 141 in the one state, and passing a signal through OR gate 167 to provide a rescan signal on line 43 and a signal on line 29 to begin the scanner 13.

The operation of the sensitivity control circuit 25 shown in detail in FIG. 5 has been described above following the first reject of a pattern. If the pattern is rejected a second time the sensitivity of amplifier 59 is adjusted to the opposite extreme. That is, if the sensitivity is raised after the first reject, the sensitivity is lowered after the second reject. If the character is rejected a third time, a signal is supplied on line 47 indicating that the reject is unrecovered.

In order to illustrate the operation of the sensitivity control circuit 25 shown in FIG. 5 in response to a second reject of an undersized pattern, it is assumed that flip-flops 147 and 143 are in the one state raising the sensitivity of amplifier 59. The object of sensitivity control circuit 25 is to decrease the sensitivity of amplifier 59 to the lowest value.

The signal on line 37 is passed through AND gate 151 at the end of the second reject. Since flip-flop 143 is in the one state AND gate 157 provides a signal to a pair of AND gates 177 and 179. With flip-flop 141 in the zero state AND gate 179 provides a signal through OR gate 173 to set flip-flop 145 in the one state. Following this, flip-flop 147 is placed in the zero state and line 109 provides a signal to gate 107 in FIG. 3. The signal from delay 165 causes AND gate 175 to set flip-flop 141 in the one state.

With both flip-flops 141 and 143 in the one state if the pattern is rejected for a third time, a signal on line 37 follows the path through AND gates 151, 157, 177 to an OR gate 181. OR gate 181 provides the signal on line 147 which indicates that the rejected pattern cannot be recovered. Following the third reject of a pattern an operator may assist by applying a signal to the operator reset terminal 48 to reset flip-flops 141, 143, 145 and 147 and provide a signal through OR gate 137 and delay 139 to line 29 to begin scanning a new pattern.

Another possible operation of the sensitivity control circuit 25 occurs when a pattern rejected for the second time is not undersized. Assuming that flip-flop 141 and flip-flop 145 are set to their one states after the first reject, the signal supplied by inverter 155 passes through AND gates 153 and 169 to a pair of AND gates 185 and 187. Since flip-flop 143 has not been switched to the one state after the first reject, AND gate 187 passes a signal through OR gate 161 and sets flip-flop 147 to its one state. Following the setting of flip-flop 147 in the one state flip-flop 145 is set to the zero state and the signal on line 87 opens gate 85 in FIG. 3 raising the sensitivity of amplifier 59 to the highest level. A signal emerging from delay 165 passes through AND gate 163 and sets flip-flop 143 in the one state, and also passes through OR gate 167 to provide the rescan signal on line 43 and the signal on line 29 to begin the scanner 13.

If the pattern is rejected a third time with flip-flops 141 and 143 now in the set state, the signal from inverter 155 passes through AND gates 153, 169 and 185 to OR gate 181 which provides a signal on line 47 indicating that the rejected pattern cannot be recovered.

In summary what has been shown is the addition of a sensitivity control circuit 25, vertical scan counter 31 and gate 41, to a character recognition system 17 and scanner 13. It has been found that the reject rate is reduced in most instances by rescanning the rejected pattern with one of the scanning parameters modified.

The variable parameter of the scanner 13 which is shown in detail in the illustrative embodiment of the present invention is the sensitivity of the scanner to light reflected from the patterns on document 11. However other parameters of the scanner 13 may be varied in accordance with the present invention. For example the size of the spot may be varied, enlarging the spot to close gaps such as those shown in FIG. 2*c* or decreasing the size of the spot to provide separation between patterns such as those shown in FIG. 2*a*. Adjustment of the spot size can be accomplished by removing the variable sensitivity amplifier 59 from the position as shown in FIG. 1 to the position illustrated by the broken lines in FIG. 1. The variable sensitivity amplifier 59′ performs the same function in response to sensitivity adjustment signals on cable 27′ thereby variably attenuating the focusing signal on line 75 prior to application to the focusing anode 77 shown in FIG. 3.

Still another parameter of the scanner 13 which may be varied in accordance with the present invention is the distance between vertical scans. As shown in FIG. 2*b*, 9 vertical scans were employed to encompass the pattern "D." A smaller or larger number may be encompassed by the pattern by adjusting the horizontal deflection circuit 65 shown in FIG. 3 to provide a variable increment between scans. This may be accomplished by inserting the variable sensitivity amplifier 59 in series with an integrator (not shown) in circuit 69, providing the horizontal deflection signal on line 73 in FIG. 3. By variably attenuating the signal prior to integration the horizontal deflection of the beam can be made to move more rapidly or more slowly in response to the reject of a pattern.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. A pattern recognition system for identifying an applied input pattern and providing a reject indication when said pattern is not identified, in combination with:

a scanner having variable parameters for illuminating selected portions of said pattern and developing a signal representative of said pattern for application to said pattern recognition system; and control means for varying a parameter of said scanner in response to said reject indication and for causing said scanner to develop a signal representative of said pattern altered to improve the ability of said character recognition system to identify said pattern.

2. A pattern recognition system for identifying an input pattern and providing a reject indication when said pattern is not identified, and a scanner for developing a signal representative of said pattern, in combination with:

detector means for operating upon that portion of said signal above a selectively variable threshold and to apply that portion of the signal to said recognition system; and control means for adjusting the threshold of said detector means in response to said reject indication and for causing said scanner to develop another signal representative of said pattern.

3. A pattern recognition system for identifying an input pattern and providing a reject indication when said pattern is not identified, and a scanner for developing a signal representative of said pattern, in combination with:

detector means for operating upon that portion of said signal above a selectively variable threshold and to apply that portion of the signal to said recognition system;

measuring means for determining the size of said pattern; and control means for causing said scanner to develop another signal representative of said pattern in response to a reject indication and for adjusting the threshold of said detecting means in a direction determined by said measuring means, so that the ability of said recognition system to identify said pattern is improved.

4. A pattern recognition system for identifying an input pattern and providing a reject indication when said pattern is not identified, and a scanner for developing a signal representative of said pattern, in combination with:

detector means for operating upon that portion of said signal above a selectively variable threshold and to apply that portion of the signal to said recognition system;

measuring means for determining whether said pattern appears to be less than a certain minimum size; and control means for causing said scanner to develop another signal of said pattern in response to said reject indication and for decreasing the threshold of said detecting means when said measuring means indicates that said pattern is less than said minimum size.

5. A pattern recognition system for identifying an input pattern and providing a reject indication when said pattern is not identified, and a scanner for developing a signal representative of the optical properties of said pattern along a plurality of parallel vertical scans, in combination with:

detector means for operating upon that portion of said signal above a selectively variable threshold and to apply that portion of the signal to said recognition system;

measuring means for counting the number of vertical scans encompassed by said pattern; and control means responsive to said reject indication for causing said scanner to develop another signal of said pattern and for adjusting the threshold of said detecting means in a direction determined by the number of vertical scans counted by said measuring means.

6. A pattern recognition system for identifying an input pattern and providing a reject indication when said pattern is not identified, and a scanner for developing a signal representative of the optical properties of said pattern along a plurality of parallel vertical scans:

detector means for operating upon that portion of said signal above a selectively variable threshold and to apply that portion of the signal to said recognition system;

counting means for counting the number of vertical scans encompassed by said pattern and determining whether said pattern appears to be less than a certain minimum size; and control means responsive to said reject indication for causing said scanner to develop another signal representative of said pattern and for decreasing the threshold of said detecting means when said counting means indicates that said pattern is less than said minimum size.

7. A pattern recognition system for identifying an input pattern and providing a reject indication when said pattern cannot be identified, and a scanner for developing a signal representative of the optical properties of said pattern along a plurality of parallel vertical scans:

detector means for operating upon that portion of said signal above a selectively variable threshold and to apply that portion of the signal to said recognition system;

counting eans for counting the number of vertical scans encompassed by said pattern;

detector control means responsive to said counting means for adjusting the threshold of said detecting means in a direction determined by the number of vertical scans encompassed by said pattern; and scanner control means including a digital-to-analog converter arranged to convert the number of vertical scans counted by said counting means into an analog signal, said analog signal being applied to said scanner to reposition said scanner to develop another signal of said pattern.

8. A pattern recognition system for identifying an input pattern and providing a reject indication when said pattern is not identified, and a scanner for developing a signal representative of the optical properties of said pattern along a plurality of parallel vertical scans:

detector means for operating upon that portion of said signal above a selectively variable threshold and to apply that portion of the signal to said recognition system;

counting means for counting the number of vertical scans encompassed by said pattern and determining whether said pattern appears to be less than a certain minimum size;

detector control means for decreasing the threshold of said detecting means when said counting means indicates that said pattern is less than said minimum size; and scanner control means including a digital-to-analog converter arranged to convert the number of vertical scans counted by said counting means into an analog signal, said analog signal being applied to said scanner to reposition said scanner to develop another signal of said pattern.

9. A pattern recognition system for identifying an input pattern and providing a reject indication when said pattern is not identified, and a scanner having horizontal and vertical deflection circuits for developing a signal representative of the optical properties of said pattern along a plurality of parallel vertical scans, in combination with:

deflection means for operating upon that portion of said signal above a selectively variable threshold and to apply that portion of the signal to said recognition system;

counting means for counting the number of vertical scans encompassed by said pattern;

detector control means responsive to said counting means for adjusting the threshold of said detecting means in a direction determined by the number of vertical scans encompassed by said pattern; and scanner control means including a digital-to-analog converter arranged to convert the number of vertical scans counted by said counting means into an analog signal, said analog signal being applied to said horizontal deflection ciricuit to reposition said scanner to develop another signal of said pattern.

10. Apparatus as defined in claim 9 wherein said counting means includes means for determining whether said pattern appears to be less than a certain minimum size; and said detector control means includes means for decreasing the threshold of said detecting means when said pattern appears to be less than said minimum size.

11. A pattern recognition system for identifying an input pattern and providing a reject indication when said pattern is not identified, in combination with:

a scanner having variable parameters for illuminating selected portions of said pattern with a spot of light of variable size and developing a signal in response to light above a selectively variable threshold for application to said character recognition system; and control means responsive to said reject indication for varying a parameter of said scanner and for causing said scanner to develop another signal of said pattern altered to improve the ability of said pattern recognition system to identify said pattern.

No references cited.

DARYL W. COOK, *Acting Primary Examiner.*

J. E. SMITH, *Assistant Examiner.*